(12) United States Patent
Heesch

(10) Patent No.: US 6,361,258 B1
(45) Date of Patent: Mar. 26, 2002

(54) PERMANENTLY PLACEABLE FASTENERS, INSERTER HEAD FOR FASTENER PLACEMENT AND RELATED METHODS

(76) Inventor: Gary V. Heesch, 1614 E. 5600 South, Salt Lake City, UT (US) 84121

( * ) Notice: Subject to any disclaimer, the term of this patent is extended or adjusted under 35 U.S.C. 154(b) by 0 days.

(21) Appl. No.: 09/611,027

(22) Filed: Jul. 6, 2000

(51) Int. Cl.[7] .............................. F16B 23/00; F16B 37/12
(52) U.S. Cl. ...................... 411/178; 411/397; 411/399; 411/407; 411/410
(58) Field of Search ................................. 411/178, 396, 411/397, 374, 403, 404, 407, 410, 399, 456

(56) References Cited

U.S. PATENT DOCUMENTS

| | | | | |
|---|---|---|---|---|
| 874,611 A | * | 12/1907 | Mortimore | 411/456 |
| 1,082,945 A | * | 12/1913 | Graham | 411/407 X |
| 1,238,636 A | * | 8/1917 | Christofferson | 411/399 |
| 3,197,894 A | * | 8/1965 | Ratkowski | 411/393 X |
| 5,116,337 A | * | 5/1992 | Johnson | 411/407 X |
| 5,439,339 A | * | 8/1995 | Batchelor | 411/410 X |
| 5,482,418 A | * | 1/1996 | Giannuzzi | 411/399 X |
| 5,549,677 A | * | 8/1996 | Durr et al. | 411/397 X |

FOREIGN PATENT DOCUMENTS

| | | | | |
|---|---|---|---|---|
| GB | 2232218 | * | 12/1990 | 411/410 |
| JP | 2-42204 | * | 2/1990 | 411/178 |

* cited by examiner

Primary Examiner—Neill Wilson
(74) Attorney, Agent, or Firm—Lynn G. Foster

(57) ABSTRACT

Fasteners and devices and methods for placing fasteners in a workpiece are disclosed. More particularly, non-removable permanently-placeable fasteners for placement in a workpiece to hold elements thereof together, permanently-placeable but removable fasteners for placement in a workpiece to hold elements thereof together, headless removable one-way fastener inserter or heads by which the fasteners are placed, tools for permanently placing such fasteners, tools for removing certain of the fasteners and methods by which such fasteners are placed in, and in some cases removed from a workpiece.

31 Claims, 3 Drawing Sheets

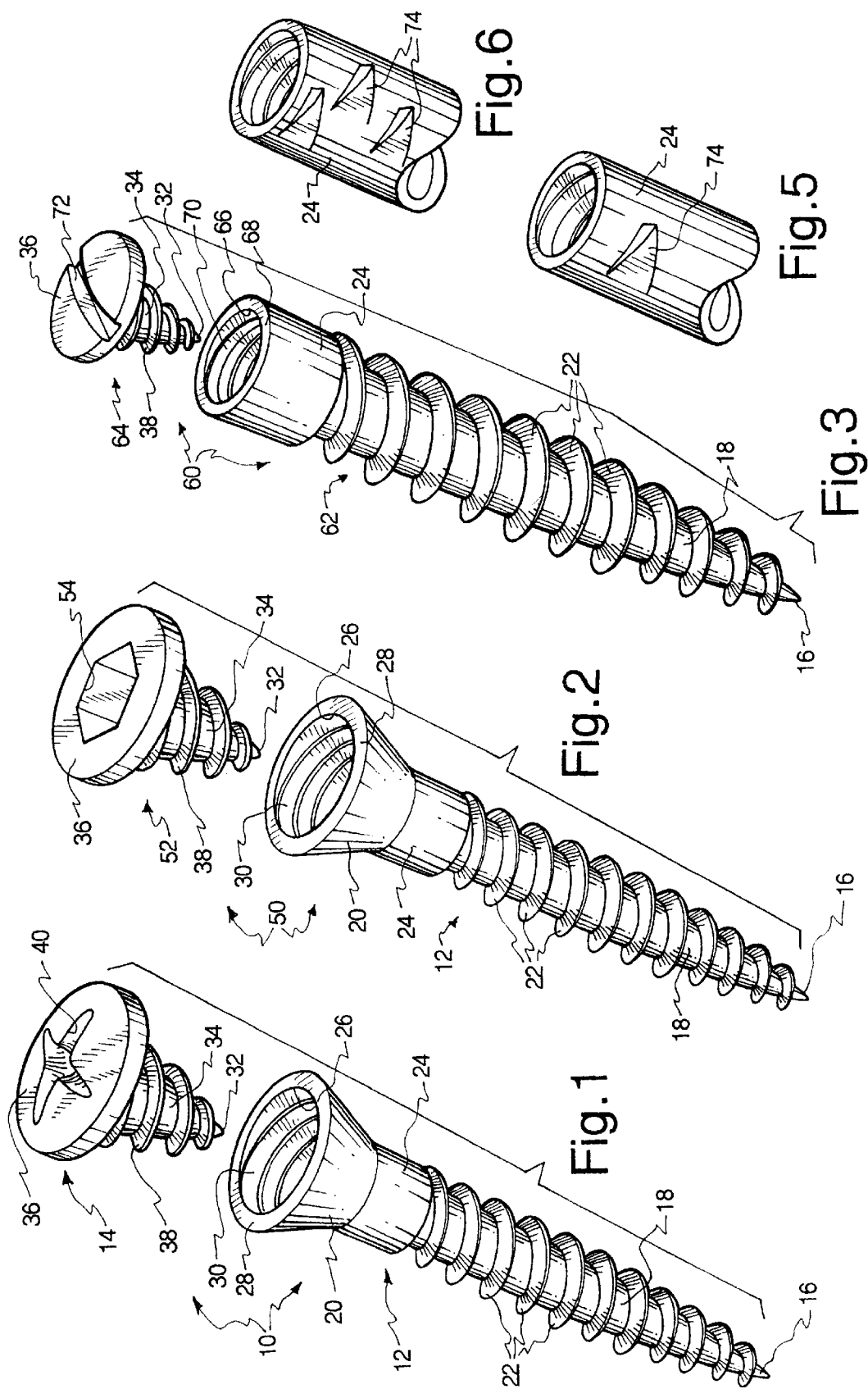

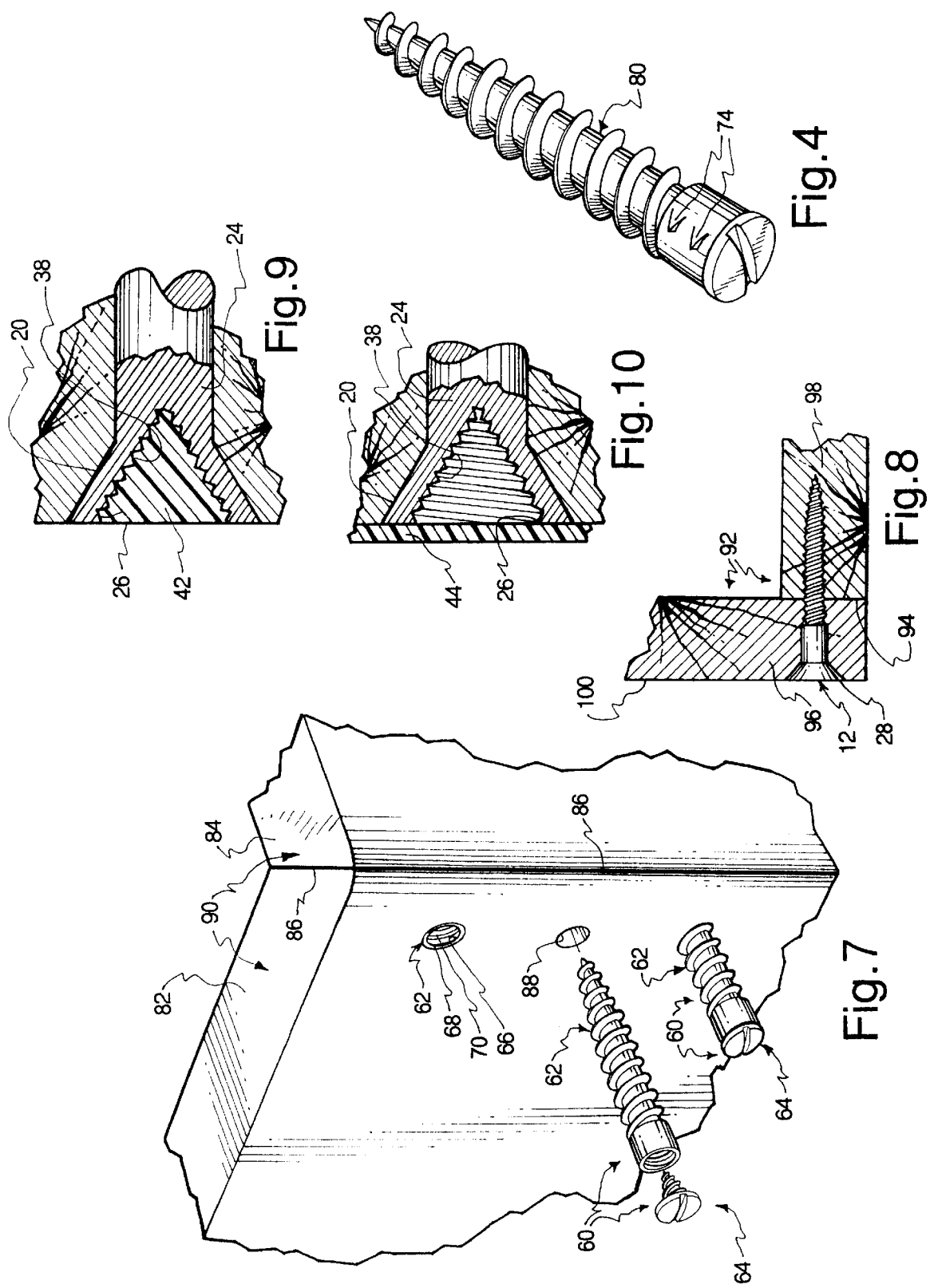

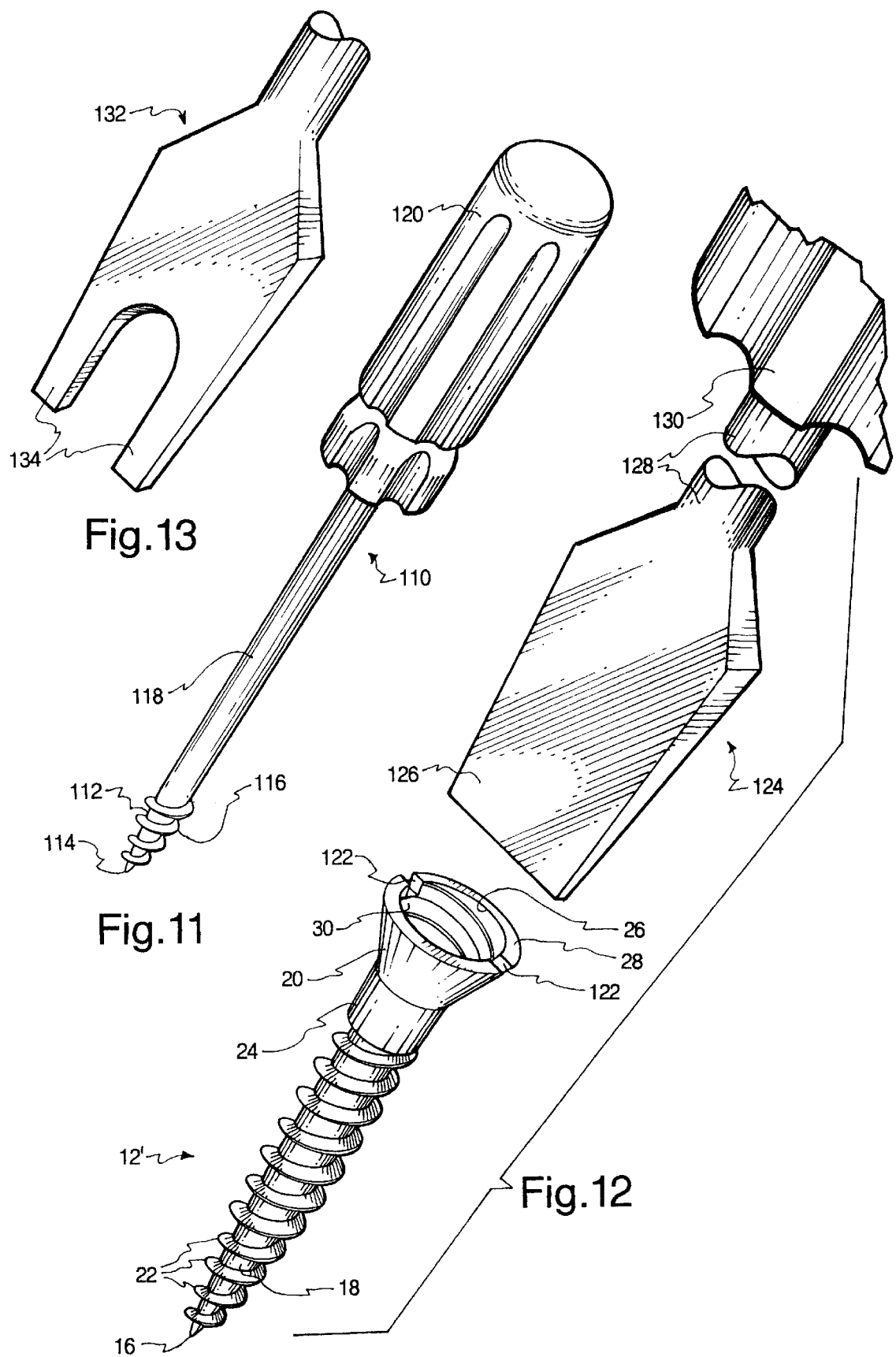

PERMANENTLY PLACEABLE FASTENERS, INSERTER HEAD FOR FASTENER PLACEMENT AND RELATED METHODS

FIELD OF THE INVENTION

The present invention relates generally to fasteners and devices and methods for placing fasteners in a workpiece and, more particularly, to novel non-removable permanently-placeable fasteners, permanently-placeable but removable fasteners, headless removable one-way fastener inserters or heads, tools for permanently placing such fasteners, tools for removing certain of such fasteners and methods by which such fasteners are placed in, and in some cases removed from a workpiece.

BACKGROUND

It is standard for threaded (bolt and screw) fasteners to comprise a proximal head which can be tightened or loosened by rotation using a tool such as a wrench or screwdriver. The tool can be manual or powered. Thus, with such bolt and screw fasteners, removal after placement in a workpiece remains an option.

In some applications, permanent placement of fasteners would be desirable. Conventional threaded fasteners cannot so function, but, because they have a permanent tool-receiving head, remain removable even after being operatively connected to a workpiece.

By way of example only, because safes have in the past utilized removable threaded fasteners to assemble components, factory assembly has been required. Availability of permanently-placed fasteners would accommodate shipment of the separate safe components for assembly by the end user thereby reducing costs.

Other uses exist for permanently-placed, non-removable threaded fasteners.

In some cases, permanently placed fasteners, which nevertheless can be removed with a specialized tool when such is mandated, even if only rarely so, would likewise be desirable.

BRIEF SUMMARY AND OBJECTS OF THE INVENTION

In brief summary, the present invention overcomes or substantially alleviates fastener-related problems of the past, and provides unique, permanently-placeable non-removable fasteners, permanently-placeable but removable inserter heads and specialized tools for placement of such fasteners, specialized tools for removal of permanently placed fasteners, and related methods.

With the foregoing in mind, it is a primary object of the present invention to overcome or substantially alleviate fastener-related problems of the past.

It is a further object of great value to provide unique permanently-placeable non-removable fasteners, and related methods.

Another valuable object is the provision of novel permanently-placeable, yet removable fasteners.

It is another dominant object to provide novel inserter heads and/or specialized tools for placement of non-removable fasteners, and related methods.

An additional object is the provision of specialized tools for removal of permanently placed fasteners.

These and other objects and features of the present invention will be apparent from the detailed description taken with reference to the accompanying drawings.

BRIEF DESCRIPTION OF THE DRAWINGS

FIG. 1 is an exploded perspective of one permanently placeable fastener/inserter head embodiment of this invention;

FIG. 2 is an exploded perspective of a second permanently placeable fastener/inserter head embodiment of this invention;

FIG. 3 is an exploded perspective of a third permanently placeable fastener/inserter head embodiment of this invention;

FIG. 4 is a perspective of another non-removable fastener comprising one-way anti-rotate barbs;

FIGS. 5 and 6 are fragmentary perspectives of the proximal ends of permanently placeable fasteners respectively comprising three and one one-way anti-rotate barbs;

FIG. 7 shows in perspective three fasteners being non-removably threaded into a workpiece using a removable inserter head in each case;

FIG. 8 is a fragmentary cross section showing a fastener according to the present invention fully introduced in operable relation into an angular lap joint of a workpiece.

FIG. 9 is a fragmentary cross section of the proximal end of a fastener, fully inserted into a workpiece, and filled with a suitable filler material;

FIG. 10 is a fragmentary cross section of the proximal end of a fastener, fully inserted into a workpiece and covered by a layer of material;

FIG. 11 is a fragmentary perspective of a specialized tool, used in lieu of an inserter head, to permanently place a fastener in a workpiece;

FIG. 12 is a perspective of a novel permanently-placeable, though removable, fastener and a specialized tool for removing the fastener from a workpiece; and FIG. 13 is a fragmentary perspective of another specialized tool for removing a permanently placed fastener from a workpiece.

DETAILED DESCRIPTION OF THE ILLUSTRATED EMBODIMENTS

Reference is now made to the drawings wherein like numerals are used to designate like parts throughout. The present invention discloses permanently-placeable, non-removable fasteners, permanently-placeable but removable fasteners, inserter heads and a tool for, in the alternative, releasable connection to and placement of non-removable fasteners or removable fasteners in a workpiece, tools for removing such fasteners, and related methods. The fasteners, with one exception, are headless and the inserter heads and the insertion tool are one-way, meaning each inserter head or the insertion tool is connected to an associated non-removable fastener when displaced in one direction to accommodate permanent placement of the fastener in a workpiece, but is removed from the associated fastener when displaced in a second direction, after the fastener is permanently placed in operative relation with the workpiece.

When permanently placed fasteners, which are removable are used, their removability may be camouflaged so that removability is not readily apparent.

Thus, in many embodiments of the present invention, the inserter head or the insertion tool and headless fasteners are placed in piggy-back relationship to accommodate insertion or placement of the fastener in the workpiece. In one presently preferred configuration, the permanently-placeable fastener comprises a pointed distal end or tip, a shaft portion comprised of exposed exterior male threads carried by the shaft portion and a headless proximal portion adapted to receive a one-way inserter head. The proximal end of the fasteners formed in accordance with the principles of the present invention may be on the order of an extension of the shaft portion so as to comprise an annulus of the same diametrical size as the shaft portion or nearly so, or the proximal portion may comprise a diametrally enlarging conical configuration. Other suitable proximal end configurations may be utilized as well without departing from the scope of the present invention.

When the inserter head or the insertion tool is configured so as to connect by external, male threads with the proximal portion of an associated fastener, the proximal end of the fastener is equipped with female internal mating threads disposed in a recess in the proximal end of the fastener such that, for example, clockwise rotation of the inserter head into the proximal end of the fastener non-rotatably connects the inserter head and the fastener so long as the clockwise rotation occurs. Thus, when a suitable tool, manual or powered, is non-rotatably coupled to the inserter head or, in the alternative, the insertion tool is used to accommodate and accomplish the above-mentioned one-way rotation, continued one-way rotation jointly rotates the inserter head or insertion tool and fastener into the desired workpiece location, typically connecting and holding two elements of the workpiece into assembled, operative relation, while typically obviating removal of the fastener.

When the fastener is permanently non-removably placed in the workpiece, as shown in FIG. 8, counterclockwise rotation of the tool will unthread the inserter head from the operatively positioned fastener, leaving the fastener headless and non-removable in said operative relation in the workpiece.

When the fastener is permanently but removably placed in the workpiece, using the fastener of FIG. 12, for example, the fastener is headless but has inconspicuous slots which accommodate removal of the fastener, when mandated. The structure by which the fastener is removed, if left exposed, is inconspicuous or, in the alternative, may be concealed by filler, a covering, or in any other suitable way, which filler or covering will need to be removed for use of a specialized tool for engaging the removing structure and removal of the fastener.

One-way or directional barbs, carried at or in the surface of the fastener and appropriately oriented, may be utilized to prevent or substantially inhibit counterclockwise rotation of the operatively positioned fastener. Any suitable barb directional orientation may be utilized including, but not limited to, a circumferential or radial orientation. One or more barbs may be used and, if desired, directional barbs in accordance with the present invention may comprise part of a tool-receiving proximal end of a screw fastener.

FIG. 1 illustrates a headless fastener in combination with an inserter head, the combination being generally designated 10. The fastener is generally designated 12 and the inserter head is generally designated 14. While the fastener 12 and the inserter head 14 can be formed out of any suitable material, typically metal of one type or another will be the .Most suitable material. Appropriate metals include steel, brass and bronze.

The fastener 12 comprises a pointed distal end or tip 16, an intermediate shaft portion 18 and a proximal headless end 20. The shaft portion 18 is illustrated as comprising male, externally-exposed threads 22. Thus, fastener 12 is a threaded fastener. The threaded portion 18 is illustrated as being of solid material. The shaft portion 18 merges with the proximal end portion 20 at an annular connector 24, which is illustrated as being solid. Proximal end portion 20 is illustrated as being conical or funnel-shaped and comprises a female recess 26, which opens at the distal face 28 of the proximal end 20. The conical recess 26 comprises interior female threads 30, which collectively define a conical configuration. The end face 28 is illustrated as comprising a transverse surface, the entirety of which is disposed in a single plane. This proximal edge surface 28 may be placed so that it is flush with a surface of a workpiece, when fully and operatively installed therein, in the manner explained in this specification. See FIG. 8, for example.

The inserter head 14 comprises a distal tip 32, a conically-shaped intermediate portion 34 and an enlarged generally disc-shaped flange 36. The intermediate conical portion 34 comprises male, external conically-configurated threads 38, which are sized to threadedly engage threads 30 contained within the female recess 26. The proximal flange 36 is illustrated as comprising a cross-shaped recess 40, sized, shaped and located so as to accommodate reception of a conventional Phillips screwdriver, either powered or manual.

Accordingly, when the Phillips screwdriver is placed in cross slot 40, the inserter head 14 distally advanced in recess 26 and the inserter head 14 rotated counterclockwise, the inserter head 14 first tightens into non-rotatable relationship with the fastener 12. Continued clockwise rotation of the inserter head 14 and the fastener 12 when the tip 16 is appropriately contiguous with a suitable workpiece will cause the fastener 12 to turn into the workpiece until an operative relation is obtained, such as that shown in FIG. 8.

At that time, counterclockwise rotation of the inserter head 14, using the Phillips screwdriver, will unthread the inserter head 14 from the fully positioned fastener 12, leaving the fastener 12 non-removable, permanently and correctly placed in the workpiece. At this point, the recess 26 may be left exposed or, in the alternative, it may be filled with a suitable material 42 (FIG. 9) or covered by a coating, film or layer 44, as illustrated in FIG. 10.

Reference is now made to FIG. 2, which shows a second inserter head/fastener embodiment, generally designated 50, in accordance with the principles of the present invention. Combination 50 comprises the heretofore described fastener 12, shown and correspondingly enumerated in FIG. 1, and an inserter head, generally designated 52. Inserter head 52 is identical to the inserter head 14 with the exception that a blind bore Allen wrench recess 54 is provided in the plate 36, at the proximal face thereof, in lieu of the cross slot 40. Other than accommodating utilization of an Allen wrench in conjunction with polygonal blind bore 54, in lieu of a Phillips screwdriver in conjunction with cross slot 40, inserter head 52 is structurally and functionally essentially the same as described in conjunction with inserter head 14 of FIG. 1. Because the combination embodiment 50 is substantially identical, with the one exception, to the combination 10, corresponding reference numerals have been used to identify the various elements comprising fastener 12 and inserter head 52 and no further description of the inserter head/fastener 50 is needed.

With reference to FIG. 3, a further inserter head/fastener combination, generally designated 60, is illustrated. Combination 60 comprises a headless fastener, generally designated 62 and an inserter head, generally designated 64. Fastener 62 is substantially identical to fastener 12 of FIG. 1, except that the conical proximal end 20 has been eliminated and a conical recess with interior female threads has been provided in annular segment at 24. The proximal female recess 66 in the proximal portion 24 commences at transverse planar edge 68. The recess 66 is generally funnel-shaped or in the shape of an internal cone defining interior conically-configured female threads 70, which are sized to mate with threads 38 of the inserter head 64. The only difference between the inserter head 64 and the inserter head 14 is that the size of the threaded cone 32 is smaller, in order to fit threadedly into smaller recess 66, and the proximal flange 36 comprises, at its proximal face, a single linear slot 72 for receipt of a standard screwdriver, powered or manual, in lieu of the Phillips cross slot 40. The elements of the combination 60 which correspond to the elements of the combination 10 of FIG. 1 are correspondingly enumerated in FIG. 3 and no further description thereof is deemed necessary.

As illustrated fragmentarily in FIGS. 5 and 6, fasteners in accordance with the present invention, including but not limited to those illustrated in FIGS. 1 through 3, may be equipped with one-way or directional barbs exposed at or on the exterior of the fastener. For example, the annular proximal segment 24 may comprise a single directional barb 74 (FIG. 5) or several directional barbs 74, as shown in FIG. 6. The barbs merge in a clockwise direction with the annular exterior surface of the proximal portion 24 so that during clockwise rotation of the fastener, by which the fastener is secured in operative relation to a workpiece, the barb or barbs 74 provide little, if any, resistance to said rotation. However, the barbs 74 are oriented in such a way that the barb or barbs 74 prohibit or substantially prevent counterclockwise rotation because the tip of each barb bites, in an anti-rotational fashion, into the contiguous workpiece. This is helpful in two respects, i.e., (1) it holds the inserted fastener in place as the inserter head is removed via counterclockwise rotation and (2) it prohibits subsequent inadvertent removal of the fastener from the workpiece.

The above-described barbs 74 or other barb configurations consistent with the scope of the present invention may be utilized with any type of a conventional threaded fastener which comprises a tool-receiving head, such as fastener 80, shown in FIG. 4.

The nature of the workpiece with which permanently placeable fasteners, made in accordance with the present invention, may be utilized is essentially immaterial. Any type of workpiece comprising at least two elements to be secured together by a permanently-placed fastener or plurality of permanently-placed fasteners in accordance with the present invention fall within the scope of this invention. For example, with reference to FIG. 7, a plurality of fasteners 62 using inserter heads 64 are illustrated as being utilized to secure angularly-related elements 82 and 84 of workpiece 90, at mitered corner 86. Three fastener locations are illustrated, the top one of which illustrates one fastener 62 permanently positioned flush with the exterior surface of the workpiece with the inserter head removed. The middle fastener in FIG. 7 is illustrated in exploded perspective with the inserter head 64 about to be threaded into the proximal thread recess of the associated fastener 62, in piggy-back relation. Thereafter, the middle fastener 62 will be threaded into the workpiece bore 88 until it is fully inserted and non-removable, in the manner shown at the top fastener in FIG. 7.

The third bottom fastener shown in FIG. 7 illustrates an inserter head 64 threaded into an associated fastener 62, with the fastener partially threaded into the workpiece 90.

A second workpiece, generally designated 92, is illustrated in FIG. 8 and comprises a lap joint 94 formed by first and second workpiece members or elements 96 and 98. A single workpiece securing fastener 12 is illustrated in FIG. 8 as connecting the two elements 96 and 98 in permanently-placed, non-removable operative relation with the proximal edge 28 being illustrated as being flush with surface 100 of member 96.

It is to be appreciated that fasteners and inserter heads in accordance with the present invention, and the one-way anti-rotate barbs of the invention may be used in any suitable fastener context, including but not limited to the assembly of safes using elements or components that are assembled and fastener-secured one to another. Each detachable screw head allows the threaded fastener to be securely placed in the workpiece with no chance of removal. When removing a detachable screw head, the threaded fastener will remain in place. This invention has unlimited applications where a threaded fastener is meant to stay in place permanently to prevent entry, destruction, vandalism, to do finish work with no screw head exposed, and can provide a stronger bond and attachment than welding, soldering or clamping. It also provides for products, such as safes, to be shipped and sold in sections to the end user for assembly.

In lieu of a separate inserter head of the type described above, the present invention contemplates the utilization of a tool to accomplish the same elemental objectives. One such tool is illustrated in FIG. 11 and generally designated 110. Tool 110 comprises a conically-shaped distal end 112 comprising a distal tip 114 and distal, conically-configurated threads 116, which may be a spiral in configuration and sized and shaped so as to mate with the internal threads, such as threads 30, in a proximal conically-shaped recess, such as recess 26, at the distal end of a fastener in accordance with the present invention.

The tool 110 also comprises an intermediate shaft 118, which is illustrated as being of uniform diameter, solid and comprised of a smooth exterior. The tool 110 terminates in a proximal segment 120, illustrated as being somewhat enlarged and cylindrical in its configuration. The proximal end portion 120 may comprise either a handle which is gripped manually, or a chuck to be received by a power tool for joint rotation, depending on whether the rotation of the tool 110 is to be manual or powered. The exact configuration of the tool 110 may be varied, but the distal end 112, which must threadedly engage the proximal end a fastener in accordance with the present invention, in the manner described above. The tool 110 may be formed of any suitable material, including, but not limited to, steel, stainless steel, brass or a strong synthetic resinous material.

The tool 110 is used as both or a combination of an insertion head, at distal end 112, and a screwdriver-type tool in the manner heretofore described in conjunction with inserter heads 14, 52 and 64, together with a Phillips screwdriver, an Allen wrench and a standard screwdriver, respectively.

Reference is now made to FIG. 12 which illustrates a fastener 12', identical and correspondingly enumerated to the previously described fastener 12 of FIG. 1, except for the addition of two opposed notches or slots 122, which are placed in the proximal face 28 to accommodate receipt of a screwdriver-like tool, generally designated 124 in FIG. 12.

Thus, when fastener 12' has been inserted into a workpiece, for example as illustrated in FIG. 8, it may be removed by placing the distal blade end 126 in the slots 122, followed by counterclockwise rotation of the tool 124, resulting in an unthreading of the fastener 12' from its placement in the workpiece. The slots 122 are visually difficult to perceive and may be filled after fastener placement to enhance their concealment using a filler material, such as filler 42, illustrated in FIG. 9. This may take place at the same time as the filler material 42 is placed in recess 26 of the fastener, in the manner shown in FIG. 9. In the alternative, the slots 122 may be concealed by a layer of material, such as layer 44, illustrated in FIG. 10.

The tool 124 is illustrated as comprising a central shaft 128 and a proximal end portion 130, which may either be a handle for manually grasping the tool 124 or a chuck for placement in a power tool to accommodate rotation of the tool when the blade 126 is engaged in the slots 122 to remove the fastener 12' from its associated workpiece.

In lieu of the tool 124, the tool 132 shown in FIG. 13 may be used. Tool 132 comprises a pair of aligned blades 134 which respectively are sized, shaped and disposed so as to fit respectively within the two slots 122 for removal of the fastener 12'.

It is to be appreciated that the fastener 12' may be equipped with retaining directionalized barbs, such as barbs 74 illustrated in FIGS. 5 and 6.

It is to be appreciated that the present specification presumes that clockwise rotation of fasteners in accordance with the present invention will tighten the fastener into a workpiece. Similarly, it is assumed that clockwise rotation of the inserter heads and the insertion tool will tighten the same non-rotatably to the associated fastener. However, if the threads of the fasteners, tools and inserter heads in accordance with the present invention have non-standard, directionally reversed threads, which require counterclockwise tightening, then the inserter heads and the insertion tools will be correspondingly threaded to accommodate tightening in a counterclockwise direction and loosening and removal of the insertion tube or inserter head when rotated clockwise.

The invention may be embodied in other specific forms without departing from the spirit of the central characteristics thereof. The present embodiments therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fastener combination comprising:
   a fastener for long term use comprising a distal end, a slender intermediate threaded shaft and a headless proximal end with a blunt surface adapted to be flush with one member of a multiple member workpiece, the threads of the shaft covering a substantial part of the length of the shaft, the threads being adapted to threadedly engage and connect the one member and at least another member of the multiple member workpiece;
   a removable temporary inserter for short term use sized and shaped to be connected to the headless proximal end of the fastener to accommodate tightening of the fastener into the one member and the other member of the workpiece by joint rotation of the fastener and the temporary inserter in one direction and prompt removal of the temporary inserter from the tightened fastener by rotation of the temporary inserter in respect to the fastener in another direction once the fastener is threadedly engaged with the one and other members so that the blunt surface is flush with the workpiece.

2. A piggy-back rotatable fastener for long term threaded retention in both of two workpiece members and a rotatable temporary fastener placement head for short term use, the long term fastener being intermediately threaded along an exterior surface between proximal and distal ends thereof but headless at a proximal end thereof, the temporary head being removably seated at the proximal end of the long term fastener whereby rotational force in a first direction applied to the temporary head jointly rotates the long term fastener and the temporary head to connect the threads of the long term fastener to both workpiece members for long term retention and rotational force immediately thereafter applied to the temporary head in a second direction rotates the temporary head in respect to the long term fastener promptly removing the temporary head from the long term fastener leaving the long term fastener threadedly connected to the workpiece members and the temporary head removed from the fastener.

3. A piggyback assembly comprising (a) a long term threaded fastener having a maximum predetermined diametral size and comprising a headless proximal end and (b) a removable short term head having a maximum diametral size no greater than the maximum diametral size of the fastener and comprising a distal end for correction to and placement of the fastener, the proximal end and the distal end comprising interrelated connectors which are jointly displaced in one direction to threadedly place the fastener into each of two members comprising a workpiece, with the head displaced in the opposite direction to separate the connectors leaving the long term fastener threadedly engaging both members of the workpiece and removing the short term head.

4. An assembly according to claim 3 wherein the fastener comprises a distal pointed end and external threads disposed along a central portion between the distal and proximal ends of the fastened.

5. An assembly according to claim 3 wherein the removable head comprises an integral elongated tool by which the distal end of the head is connected to and disconnected from the proximal end of the fastener.

6. An assembly according to claim 3 wherein the proximal end of the fastener comprises a female recess.

7. A piggy-back assembly comprising (a) a fastener comprising a headless proximal end and (b) a removable head comprising a distal end for connection to and placement of the fastener, the headless proximal end of the fastener and the distal end of the removable head comprising interrelated connectors which are jointly displaced in one direction to place the fastener into a workpiece location and the head is displaced in another direction to separate the connectors leaving the fastener in the workpiece and removing the head; the proximal end of the fastener comprising a female recess and terminating in a proximal face and further comprising structure at the proximal face for receiving a removal tool.

8. An assembly according to claim 6 wherein the female recess comprises internal threads and the head comprises matching external threads.

9. A piggy-back assembly comprising (a) a fastener comprising a headless proximal end and (b) a removable head comprising a distal end for connection to and placement of the fastener, the headless proximal end of the fastener and the distal end of the removable head comprising interrelated connectors which are jointly displaced in one direction to place the fastener into a workpiece location and the head is displaced in another direction to separate the connectors leaving the fastener in the workpiece and removing the head; at least one directional barb carried at the exterior of the fastener.

10. A piggy-back assembly comprising (a) a fastener comprising a headless proximal end and (b) a removable head comprising a distal end for connection to and placement of the fastener, the headless proximal end of the fastener and the distal end of the removable head comprising interrelated connectors which are jointly displaced in one direction to place the fastener into a workpiece location and the head is displaced in another direction to separate the connectors leaving the fastener in the workpiece and removing the head; at least one directional barb carried at the exterior of the proximal end of the fastener.

11. An assembly according to claim 3 wherein the fastener and the head respectively comprise interrelated one way connectors.

12. An assembly according to claim 3 wherein the connectors comprise internal and external threads, respectively.

13. A piggy-back assembly comprising (a) a fastener having a maximum predetermined diametral size and comprising a headless proximal end and (b) a removable head having a maximum diametral size no greater than the maximum diametral size of the fastener and comprising a distal end for connection to and placement of the fastener, the proximal end and the distal end comprising interrelated connectors which are jointly displaced in one direction to place the fastener into a workpiece location and the head is displaced in another direction to separate the connectors leaving the fastener in the workpiece and removing the head;
the fastener and the head respectively comprise interrelated one way connectors comprising internal and external threads, the internal and external threads being conically-shaped and matching.

14. A piggy-back assembly comprising (a) a fastener having a maximum predetermined diametral size and comprising a headless proximal end and (b) a removable head having a maximum diametral size no greater than the maximum diametral size of the fastener and comprising a distal end for connection to and placement of the fastener, the proximal end and the distal end comprising interrelated connectors which are jointly displaced in one direction to place the fastener into a workpiece location and the head is displaced in another direction to separate the connectors leaving the fastener in the workpiece and removing the head, the head being generally conical in its configuration.

15. A piggy-back assembly comprising (a) a fastener comprising a headless proximal end and (b) a removable head comprising a distal end for connection to and placement of the fastener, the headless proximal end of the fastener and the distal end of the removable head comprising interrelated connectors which are jointly displaced in one direction to place the fastener into a workpiece location and the head is displaced in another direction to separate the connectors leaving the fastener in the workpiece and removing the head; the head comprising at least one tool-receiving recess.

16. An assembly according to claim 15 wherein the tool-receiving recess selected from the group consisting of a standard screw driver slot, Phillips screw driver slots and an Allen wench-receiving blind bore.

17. A screw fastener comprising an exterior surface, a pointed distal end, a threaded shaft and a proximal head by which the fastener is rotated, the fastener further comprising at least one directional non-cutting barb carried at the exterior surface accommodating fastener rotation in one direction without significant cutting of workpiece material and inhibiting fastener rotation in the other direction, the barb projecting radially from the head and being tapered in a circumferential direction.

18. A screw fastener comprising an exterior surface, a pointed distal end, a threaded intermediate shaft and a headless proximal end by which the fastener is rotated, the fastener further comprising a threaded recess at the proximal end thereof ending in a flat annular peripheral face, the face comprising spaced notches, the threaded recess accommodating rotation of the screw fastener into the workpiece and the notches accommodating rotational removal of the fastener from the workpiece.

19. A piggy-back assembly comprising (a) a fastener comprising a headless proximal end and (b) a removable insertion tool comprising a distal end for removable connection to and placement of the fastener, the proximal end and the distal end comprising interrelated connectors which are jointly displaced in one direction to place the fastener into a workpiece location and the tool is displaced in another direction to separate the connectors leaving the fastener in the workpiece and removing the tool; at least one directional barb carried at the exterior of the fastener.

20. A piggy-back assembly comprising (a) a fastener comprising a headless proximal end and (b) a removable insertion tool comprising a distal end for removable connection to and placement of the fastener, the proximal end and the distal end comprising interrelated connectors which are jointly displaced in one direction to place the fastener into a workpiece location and the tool is displaced in another direction to separate the connectors leaving the fastener in the workpiece and removing the tool; the proximal end of the fastener comprising a female recess; the connectors comprising internal and external threads, respectively; the internal and external threads being conically-shaped and matching.

21. A screw fastener comprising an exterior surface, appointed distal end, a threaded shaft and a headless proximal end portion by which the fastener is rotated into a workpiece, the fastener further comprising a proximal threaded recess surrounded by a proximal peripheral edge having opposed slots for receiving a tool by which the fastener is rotated from the workpiece.

22. A screw fastener comprising a pointed distal end, a threaded intermediate shaft and a proximal portion by which the fastener is rotated using a tool, the fastener further comprising at least one directional non-cutting barb carried radially at the proximal portion and extending circumferentially accommodating fastener rotation in one direction without significant removal of workpiece material and inhibiting fastener rotation in the other direction.

23. A method of non-removably placing a fastener in operative relation to hold two workpiece members together, comprising the acts of:
piggy-backing a headless fastener and a fastener inserter, the headless fastener comprising a long term connector having a distal end, a proximal end comprising an exposed internally threaded bore and central external threads disposed between the distal and proximal ends, the inserter comprising external threads matching the internal threads of the bore;
rotationally temporarily connecting the external threads of the inserter and the internal threads of the bore;
applying further rotational force to the temporary inserter to rotate the central external threads of the fastener into both workpiece members;
immediately thereafter applying an opposite rotational force to the temporary inserter to remove the temporary inserter from the fastener leaving the fastener headless in its operative relation threadedly connecting the fastener to both workpiece members.

24. A method according to claim 1 wherein the connecting act comprises engaging distal external male threads of the temporary inserter with proximal internal female threads of the fastener for joint rotation in one direction and temporary inserter removal in the other direction.

25. A method according to claim 23 wherein the first applying act comprises engaging a proximal part of the temporary inserter with a tool and jointly rotating the temporary inserter and the fastener in one direction to achieve the operative relation.

26. A method according to claim 25 wherein the second applying act comprises engaging the temporary inserter with a tool and jointly rotating the temporary inserter and the fastener in another direction to remove the temporary inserter from the fastener, leaving the fastener headless, flush with one of the workpiece members and positioned for long term use in its operative relation.

27. A method according to claim 1 wherein the piggybacking act comprises the act of providing the temporary inserter with an integral handle, wherein the first applying force act is achieved by turning the handle and the second applying step comprises removing the unitary temporary inserter and handle from the fastener.

28. A method of placing a fastener having a shaft portion in operative threaded relation with a workpiece, comprising the acts of:

displacing a fastener into threaded operative relation with a workpiece in a direction where at least one non-cutting fastener barb radially disposed on the shaft portion accommodates the displacement without significant removal of workpiece material from the workpiece;

substantially inhibiting fastener displacement from said operative relation by anti-displacement engagement between the at least one fastener barb radially disposed on the shaft portion and the workpiece material.

29. A method according to claim 7 comprising the at least one fastener barb is a unidirectional non-cutting barb carried as a tapered projection at an exterior surface of the shaft portion of the fastener.

30. A method according to claim 8 wherein the non-cutting fastener barb projects radially and extends generally circumferentially.

31. A method of placing a screw fastener threadedly into two adjacent workpiece members, comprising the acts of:

temporarily collecting a separate inserter to a headless proximal end of a threaded screw fastener;

turning the temporary inserter to thereby jointly rotate in a first direction the temporary inserter and the fastener to threadedly place the fastener into each of two adjacent workpiece members;

reverse rotating in a second direction the temporary inserter in respect to the fastener to remove the temporary inserter from the fastener, leaving the fastener in the two workpiece members.

* * * * *